Figure 1:
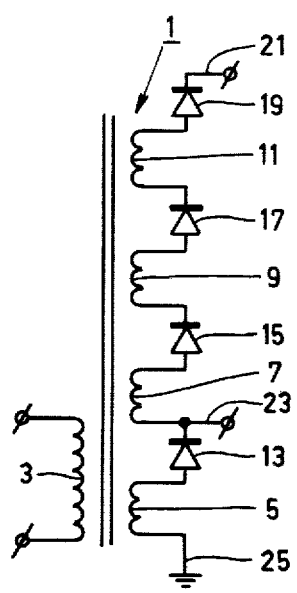

United States Patent [19]
Tol et al.

[11] 4,315,306
[45] Feb. 9, 1982

[54] HIGH-VOLTAGE GENERATING DEVICE

[75] Inventors: Franciscus Tol; Albertus B. A. Baggermans, both of Eindhoven, Netherlands

[73] Assignee: U.S. Philips Corporation, New York, N.Y.

[21] Appl. No.: 115,971

[22] Filed: Jan. 28, 1980

[30] Foreign Application Priority Data

Feb. 19, 1979 [NL] Netherlands ............... 7901280

[51] Int. Cl.³ .................................................. H02M 7/06
[52] U.S. Cl. ....................................................... 363/126
[58] Field of Search ............... 315/411; 363/126, 125, 363/144, 145

[56] References Cited
U.S. PATENT DOCUMENTS

| | | | |
|---|---|---|---|
| 3,886,434 | 5/1975 | Schreiner | 315/411 |
| 3,936,719 | 2/1976 | Miyoshi et al. | 363/126 |
| 3,947,749 | 3/1976 | Kimura et al. | 363/126 |

FOREIGN PATENT DOCUMENTS 2351130 12/1975 Fed. Rep. of Germany .
1090995 11/1967 United Kingdom .

OTHER PUBLICATIONS

Moggre, A. J., "Funkschau" Publication, 1976, Heft 24, pp. 1051-1054.

Primary Examiner—William M. Shoop
Attorney, Agent, or Firm—Bernard Franzblau

[57] ABSTRACT

A high-voltage generating device which comprises a transformer having a secondary coil subdivided into sections which are series-connected via diodes. The beginning of the first section is connected to a point of fixed potential via a further diode. The beginning and the end of the first section are also connected to this fixed potential point via first and second capacitors, respectively. As a result, a tapping lead connected, for example, to the beginning of the second section provides a voltage of from one to two times the voltage difference across a section, as desired.

7 Claims, 6 Drawing Figures

HIGH-VOLTAGE GENERATING DEVICE

The invention relates to a high-voltage generating device, notably for a television picture tube, comprising a transformer with a secondary coil which is divided into a number of sections. The end of each section, except for the end of the last section, is connected to the anode of a diode, the cathode of each diode is connected to the beginning of the next section, but the end of the last section is connected to the anode of a diode whose cathode is connected to a high-voltage lead, the cathode of at least one of the other diodes also is connected to a tapping lead.

A device of this kind is known from the magazine "Funkschau" 1976, Heft 24, pages 1051–1054. For example, the focus voltage for a picture tube is derived from the tapping lead. The voltage at the area of this tapping depends on the number of sections and on the value of the high voltage. When a higher voltage is required, the tapping lead must be connected behind the next section on the secondary winding. In many cases, however, the voltage which is tapped off behind, for example, the first section is just too low, whereas that tapped off behind the second section is much too high.

An object of the invention is to enable a direct voltage to be tapped off behind the first section which amounts to from one to two times the voltage difference between the beginning and the end of this section.

To this end, the device in accordance with the invention is characterized in that the beginning of the first section is connected to the cathode of a diode whose anode is connected to a point carrying a fixed potential, the beginning and the end of the first section also being connected, via capacitors, to the point carrying the fixed potential.

By a suitable choice of the capacitance of the two capacitors, any voltage between one and two times the voltage across a section can be tapped off at the beginning of the second section.

It is to be noted that a transformer whose secondary winding is formed by a number of sections which are connected in series via diodes, the beginning of the first section also being connected to the cathode of a diode, is known per se from U.S. Pat. No. 4,091,349. However, in this transformer none of the intermediate diodes is connected to a tapping lead and the ends of the first section are not connected to capacitors either.

Figure 2:
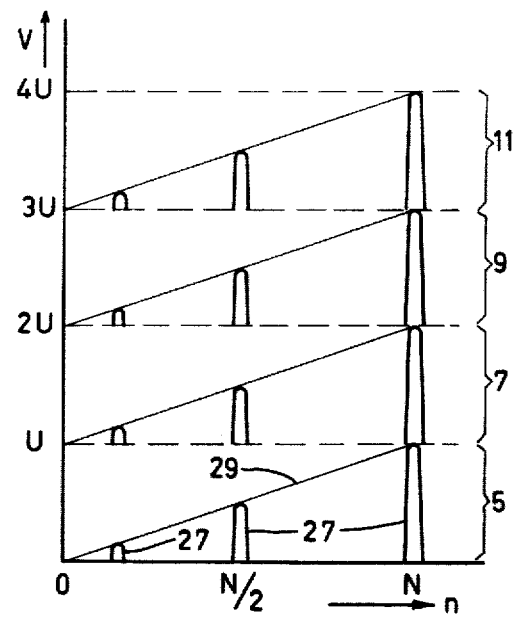
Figure 3:
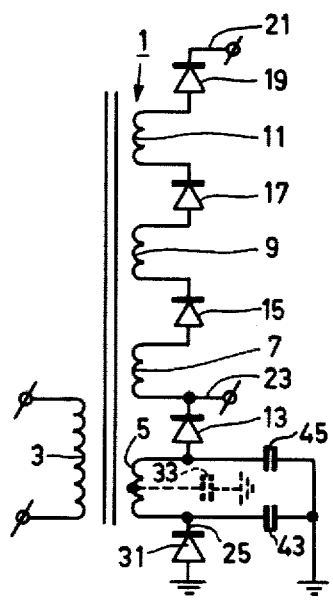
Figure 4:
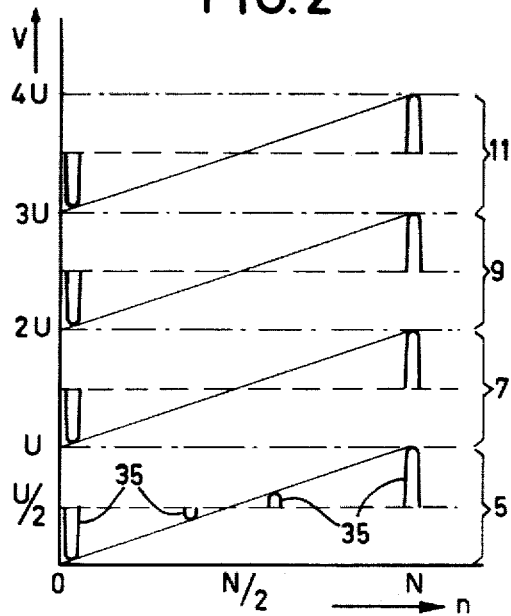
Figure 5:
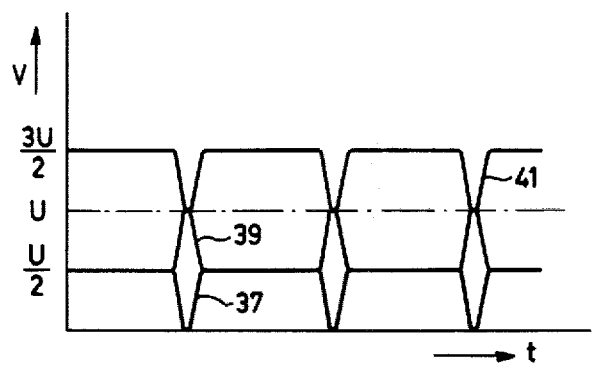
Figure 6:
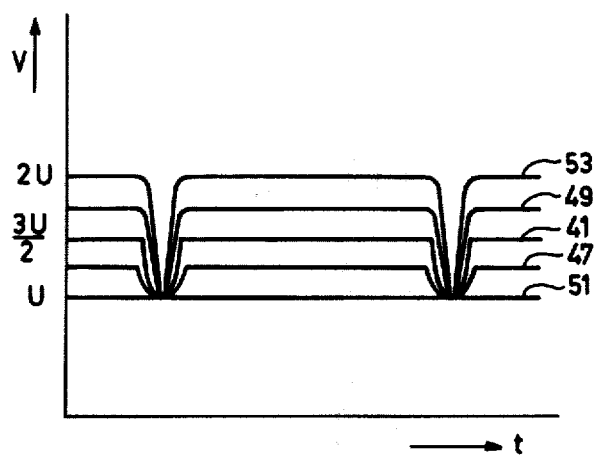

The invention will be described in detail hereinafter with reference to the accompanying diagrammatic drawing in which:

FIG. 1 shows a diagram of a known high-voltage generating device,

FIG. 2 is a diagram of the voltage present at a number of locations in the device shown in FIG. 1 at a given instant, FIG. 3 shows a diagram of an embodiment of the device in accordance with the invention, FIG. 4 is a diagram of the voltage present at a number of locations in the device shown in FIG. 3 at a given instant, FIG. 5 is a diagram which represents the variation with time of the voltage in a number of locations in the device shown in FIG. 3, and FIG. 6 shows a diagram to illustrate the voltage variation with time at a location in various versions of the device shown in FIG. 3.

FIG. 1 shows a known high-voltage generating device, comprising a transformer 1 with a primary coil 3 to which a pulse-shaped voltage is applied, for example, a line output transformer in a colour television receiver. The secondary coil is subdivided into four sections 5, 7, 9 and 11, the end of each of the first three sections 5, 7, 9 being connected to the anode of a diode 13, 15, 17, respectively, the cathode thereof being connected to the beginning of the next section. The end of the last section 11 is connected to the anode of a diode 19, the cathode of which is connected to a high voltage lead 21 which is connected, for example, to the high voltage connection of a picture tube (not shown). The cathode of the first diode 13 is also connected to a tapping lead 23 wherefrom, for example, the focus voltage for said picture tube can be derived. The beginning of the first section 5 is connected, via a connection lead 25, to a point which carries a fixed potential.

FIG. 2 illustrates the voltage variation in each section, the number of turns n being plotted horizontally and the voltage V being plotted vertically. Each section consists of N turns in which voltage pulses 27 are induced. At the beginning of the first section 5, which is connected to a point carrying a fixed potential, the magnitude of the voltage pulses is zero and at the end of the turn N it is maximum and equal to U volts. The envelope 29 of the voltage pulses 27 is a straight line. Due to the strong capacitive coupling between the sections, no alternating voltages occur between corresponding turns of successive sections, so that the voltage pulses in the second section 7 vary across the section in the same manner as the pulses in the first section 5. The beginning of this second section thus carries a direct voltage U (due to the rectification of the voltage across the first section) and a pulse voltage zero, while the end of this section carries a pulse voltage of the magnitude U which is superposed on the direct voltage U. The same is applicable to the subsequent sections so that the voltage at the end of the fourth section 11 amounts to 4 U. It will be clear that the tapping lead 23 carries a voltage U.

FIG. 3 diagrammatically shows an embodiment of a device of the described kind which has been improved in accordance with the invention. Corresponding parts of the device are denoted by the same reference numerals as in FIG. 1. The difference with respect to FIG. 1 consists in that the beginning of the first section 5 is connected, by means of the connection lead 25, to the cathode of a diode 31 whose anode is connected to a point carrying a fixed potential, and in that at the beginning of the first section there is connected a first capacitor 43, a second capacitor 45 being connected to the end thereof, said capacitors also being connected to the point carrying a fixed potential.

If the capacitances of these capacitors are equal, their combined effect corresponds to that of a capacitor 33 which connects the centre of the section to a point carrying a fixed potential (denoted by a broken line).

The result of these steps is shown in FIG. 4 which shows, like FIG. 2, the voltage variation in the various sections. Thanks to the diode 31 and the effective capacitance 33, no longer the beginning but the centre of the first section 5 is maintained at a fixed potential for alternating voltages. As a result, the voltage pulses 35 induced in this section equal zero at the area of the central turn N/2 and are oppositely directed at the two ends of the section: thus −U/2 at the beginning and +U/2 at the end. The capacitance 33 is charged so far that the diode 31 just becomes a conductive for each pulse, that is to say to a voltage +U/2 with respect to the point of fixed potential to which the anode of this diode is connected. The first section thus carries a mean voltage +U/2 on which there are superposed voltage pulses of the magnitude −U/2 at the beginning and +U/2 at the end of the section. This is shown in FIG. 5 in which the curve 37 represents the voltage variation as a function of the time at the beginning of the section. The curve 39 represents the voltage variation at the end of the section.

Due to the capacitive coupling between the first section 5 and the second section 7, corresponding turns of these two sections do not carry an alternating voltage with respect to each other, so that the voltage variation at the beginning of the second section corresponds to that of the first section, the mean voltage level, of course, being higher by the amount of te rectified voltage across the first section, so U volts. This is represented by the curve 41 in FIG. 5. It follows that the mean voltage on the tapping lead 23 equals 3 U/2 volts. This voltage is a direct voltage on which voltage pulses of −U/2 volts are superposed. If desired, these superposed voltage pulses can be eliminated by an RC network (not shown) connected to the tapping lead. Thus, a voltage is obtained on the tapping lead which is one and a half times that of the device shown in FIG. 1.

As has already been stated, it has been assumed that the capacitances of the capacitors 43, 45 are equal, so that the overall effect thereof can be represented by a capacitor 33 connected to the central turn. However, the voltage carried by the tapping lead 23 can be influenced by choosing these capacitances to be different.

When the values of the capacitors 43 and 45 are not the same, their combined effect corresponds to that of a capacitor 33 which is connected to a turn other than the central turn. The point in the section where the induced voltage pulses have the value zero is shifted accordingly across the section. When the capacitance of the first capacitor 43 is larger than that of the second capacitor 45, this point is situated nearer to the beginning of the section and vice versa. In extreme cases, this point may be situated at the beginning or at the end of the section. This means that the mean voltage level of the first section can vary from 0 to U volts. The direct voltage level of the curve 41 in FIG. 5 can vary accordingly from U to 2 U volts, the peaks of the negative pulses, of course, always reaching the level of the rectified voltage across the first section (U volts).

This is shown in FIG. 6 for a number of cases. The curve 41 in this Figure is identical to the curve 41 in FIG. 5 and relates to the symmetrical condition in which the capacitances of the capacitors 43 and 45 are equal. The curve 47 is obtained when the capacitance of the capacitor 43 (referred to hereinafter as C43) exceeds that of the capacitor 45 (referred to hereinafter as C45), so C43>C45. Curve 49 is obtained when C43<C45. Curve 51 represents an extreme situation where C43 is so large that the diode 31 is actually short-circuited for alternating voltages. This corresponds to the situation shown in FIG. 1. Finally, curve 53 represents the other extreme situation where C45 is so large that C43 can be neglected.

The foregoing demonstrates that the voltage at the tapping lead 23 can be adjusted between U and 2 U Volts by the choice of C43 and C45. The capacitors 43, 45 may consist of discrete components, but they may alternatively be formed during the winding of the section by using an adapted winding technique.

What is claimed is:

1. A high-voltage generating device comprising, a transformer having a primary coil and a secondary coil which is divided into a plurality of sections, a plurality of diodes, means connecting the end of each section, except for the end of the last section, to the anode of a diode, the cathode of which is connected to the beginning of the next section, means connecting the end of the last section to the anode of a diode whose cathode is connected to a high-voltage lead, means connecting the cathode of at least one of the other diodes to a tapping lead, means connecting the beginning of the first section to the cathode of a diode whose anode is connected to a point of fixed potential, and means connecting the beginning and the end of the first section to the point of fixed potential via first and second capacitors, respectively.

2. A high-voltage generating device comprising, a transformer having a primary winding and a secondary winding with the secondary winding divided into a plurality of winding sections, a plurality of diodes, a high-voltage output terminal, means connecting said plurality of sections in series with said plurality of diodes between said output terminal and a point of fixed potential with each section coupled to the next section by a diode and with a first diode connecting the beginning of the first section to said point of fixed potential and a second diode connecting the end of the last section to said output terminal, first and second capacitors, means coupling the beginning and end of the first section to said point of fixed potential via said first and second capacitors respectively, and means for coupling the beginning of at least one other section to a further output terminal to supply a voltage of an amplitude determined in part by said capacitors.

3. A device as claimed in claim 2 wherein said first and second capacitors have equal capacitance values.

4. A device as claimed in claim 2 wherein said first and second capacitors have unequal capacitance values.

5. A device as claimed in claim 2 wherein said further output terminal is coupled to the beginning of the second section and wherein the voltage supplied by said further output terminal can be adjusted to a value between one and two times the voltage across a section by the choice of the relative capacitance values of said first and second capacitors.

6. A device as claimed in claims 2, 3 or 4 wherein the end of at least one winding section is directly connected to the beginning of the next winding section via said diode.

7. A device as claimed in claims 2 or 5 wherein said transformer comprises the horizontal deflection transformer of a television receiver, said output terminal supplying the high-voltage for the television receiver cathode ray tube and said further output terminal supplying the focus voltage for the cathode ray tube.

* * * * *